United States Patent
Lollini

(10) Patent No.: US 9,140,225 B2
(45) Date of Patent: Sep. 22, 2015

(54) FUEL FEED NETWORK FOR A ROTORCRAFT ENGINE, THE NETWORK INCLUDING MEANS FOR PRIMING A PUMP FOR SUCKING FUEL FROM A FEED TANK

(71) Applicant: AIRBUS HELICOPTERS, Marignane, Cedex (FR)

(72) Inventor: Lionel Lollini, Montvendre (FR)

(73) Assignee: Airbus Helicopters, Marignane Cedex (FR)

( * ) Notice: Subject to any disclaimer, the term of this patent is extended or adjusted under 35 U.S.C. 154(b) by 198 days.

(21) Appl. No.: 13/870,571

(22) Filed: Apr. 25, 2013

(65) Prior Publication Data

US 2013/0284150 A1　Oct. 31, 2013

(30) Foreign Application Priority Data

Apr. 26, 2012　(FR) ...................... 12 01228

(51) Int. Cl.
*B64D 37/00*　(2006.01)
*F02M 59/00*　(2006.01)
*F02C 7/236*　(2006.01)

(52) U.S. Cl.
CPC .............. *F02M 59/00* (2013.01); *B64D 37/00* (2013.01); *F02C 7/236* (2013.01); *F05D 2220/329* (2013.01); *F05D 2260/601* (2013.01)

(58) Field of Classification Search
CPC ...... F02M 59/00; B64D 37/00; B64D 37/005; B64D 37/02; B64D 37/04; F02C 7/236; F05D 2260/601
See application file for complete search history.

(56) References Cited

U.S. PATENT DOCUMENTS

| 3,259,066 A | 7/1966 | Williams et al. |
| 3,275,061 A | 9/1966 | Williams et al. |
| 2002/0192082 A1 | 12/2002 | Hansen |
| 2003/0062031 A1* | 4/2003 | Tanimura ...................... 123/510 |

FOREIGN PATENT DOCUMENTS

| CN | 1757901 A | 4/2006 |
| CN | 101576037 A | 11/2009 |
| EP | 1264975 A2 | 12/2002 |
| GB | 851428 | 10/1960 |
| WO | 2007036480 A1 | 4/2007 |

OTHER PUBLICATIONS

Chinese Patent Application No. 201310148791.8 First Office Action; Dated Dec. 3, 2014; 21 pages with English Translation.
Korean Patent Application No. 10-2013-0043202; Examination Report; dated Aug. 28, 2014; 3 pages.
Korean Patent Application No. 10-2013-0043202 Examination Report, dated Aug. 28, 2014, 2 pages; English Translation.
Search Report and Written Opinion; Application No. FR 1201228; dated Jan. 11, 2013.

* cited by examiner

*Primary Examiner* — Lindsay Low
*Assistant Examiner* — Jacob Amick
(74) *Attorney, Agent, or Firm* — Brooks Kushman P.C.

(57) ABSTRACT

A fluid flow network for feeding fuel to at least one engine (2) of a power plant driving rotation of at least one rotary wing (1) of a rotorcraft. The fluid flow network includes a suction pump (3) for sucking fuel from a feeder tank (5) via a transfer circuit (4). The feeder tank (5) is fed with fuel from a main tank (9) by a transfer circuit (10) including a transfer pump (12). The transfer pump (12) is also a pump for priming the suction pump (3) by means of a feed ejector (15) provided on the feed circuit (4) and immersed in the feeder tank (5).

9 Claims, 1 Drawing Sheet

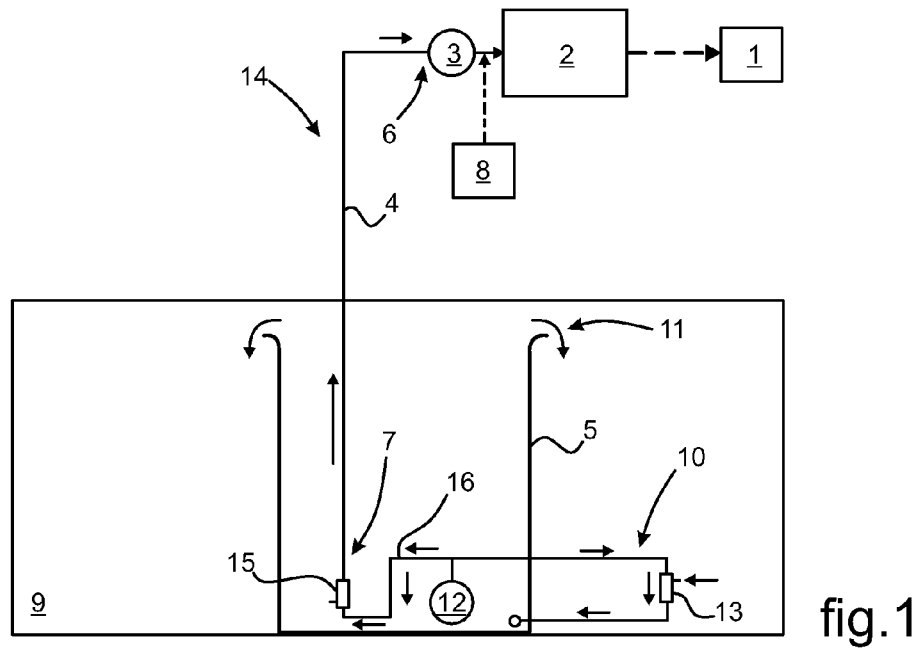
fig.1
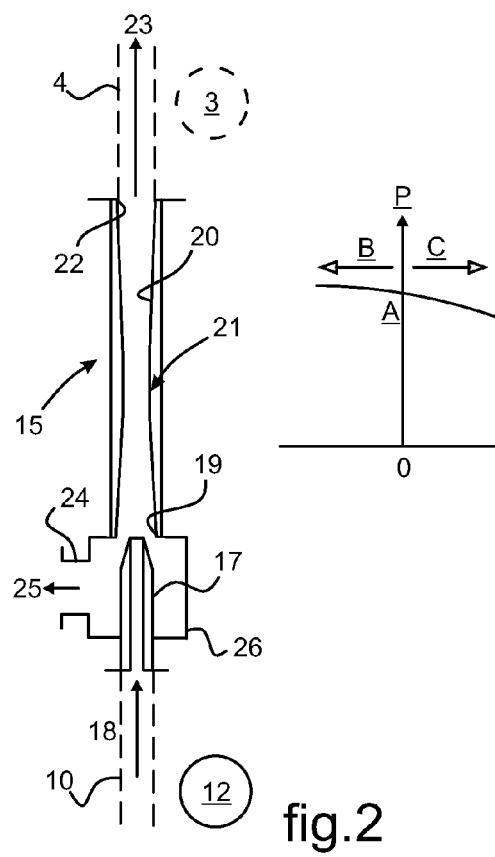
fig.2
fig.4
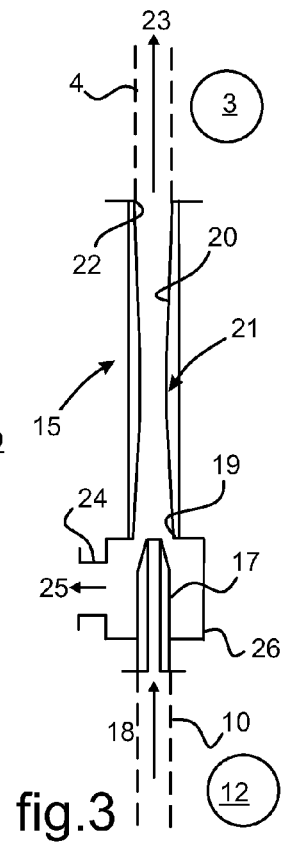
fig.3

FUEL FEED NETWORK FOR A ROTORCRAFT ENGINE, THE NETWORK INCLUDING MEANS FOR PRIMING A PUMP FOR SUCKING FUEL FROM A FEED TANK

CROSS REFERENCE TO RELATED APPLICATIONS

This application claims priority to French patent application No. FR 12 01228 filed on Apr. 26, 2012, the disclosure of which is incorporated in its entirety by reference herein.

BACKGROUND OF THE INVENTION (1) Field of the Invention

The present invention relates to the field of aircraft, and more specifically rotorcraft. Rotorcrafts are aircrafts presenting the feature of having at least one rotary wing that serves to provide them at least with lift, and possibly also with propulsion and/or with the ability to maneuver in flight. Such a rotary wing is driven in rotation at a generally constant speed by a power plant having one or more engines.

The rotary wing may equally well be a main rotary wing providing at least the lift if not also the propulsion of the rotorcraft and/or its maneuverability in flight, or a propulsive propeller in a hybrid helicopter, for example, or indeed a tail rotary wing serving to enable the rotorcraft to be maneuvered in yaw.

The present invention relates more particularly to a fluid flow circuit for feeding fuel to a said power plant dedicated to driving the rotation of at least one rotary wing of a rotorcraft.

(2) Description of Related Art

Said power plant may have one or more engines, depending on regulation categories that are well known in the field of rotorcraft. In order to limit the number of engines on board a rotorcraft, it is common to use a single power plant to drive the rotation of various rotary wings fitted to the rotorcraft. Conventionally, the power plant is located on the rotorcraft as close as possible to the main rotary wing that is situated on top of a cabin of the rotorcraft, with the engine(s) being fed with fuel via a fluid flow network forming part of the rotorcraft.

Such a fluid flow network has a main fuel tank that is commonly located under the cabin. The main tank may include one or more compartments with natural fluid flow communication between them. For a main tank of large capacity, it is common practice to have a feeder tank housed within the main tank. The fuel is taken from the feeder tank to feed an engine allocated thereto. The feeder tank is formed by an enclosure placed inside the main tank and it presents capacity suitable for enabling the engine to be supplied with a quantity of fuel that is predefined with respect to regulatory conditions for safe flight. The feeder tank and the main tank form capacities that are independent with respect to free communication of fuel from the main tank to the feeder tank.

The feeder tank is supplied with fuel from the main tank by a transfer circuit that uses a transfer pump housed inside the feeder tank. The transfer circuit comprises in particular an ejector or an analogous member placed inside the main tank in order to trap a contribution of fuel and discharge it towards the feeder tank. From a flow of a primary fuel stream generated by the transfer pump inside the transfer circuit, such an ejector induces the capture of a secondary fuel stream that is discharged together with the primary stream out from the ejector into the feeder tank. Since the capacity of the feeder tank is limited in terms of said predetermined quantity of fuel, the feeder tank has an overflow device that allows excess fuel to be restored to the main tank by overflowing.

Given the proximity between the main tank and the feeder tank, and given the low head losses induced by the transfer circuit, the transfer pump is a low pressure pump, by way of indication it operates at a pressure of less than 200 millibars (mbar) approximately, and more commonly less than 100 mbar. The transfer pump is driven in particular by electricity taken from the electricity network on board the rotorcraft.

In general terms, the ejector comprises an upstream nozzle for admitting a primary fluid stream into a main channel that has a constriction. A secondary channel for admitting a secondary fluid stream opens out into the main channel upstream from the nozzle. The flow of the primary stream inside the main channel acts by suction to capture the secondary stream of fluid via the secondary channel. The secondary stream and the primary stream mix together upstream from the constriction and then the total stream of fluid from this mixture is exhausted from the ejector downstream from the constriction. The notions of upstream and downstream should be considered relative to the flow direction of the streams in question through the ejector.

An ejector is a member commonly used in the field of aviation for fluid flow networks for feeding fuel to an engine. Conventionally, an ejector enables the flow rate of fuel flowing through the fluid flow network to be regulated to match requirements. By way of example, this ability of an ejector is used to feed the feeder tank from the main tank via the transfer circuit, as mentioned above. Other applications are known for such ejectors in the context of feeding fuel to an aircraft engine.

For example, according to document U.S. Pat. No. 3,275,061 (Boeing Co.), a feed ejector is located at the bottom of the feeder tank on a circuit for feeding fuel to an engine of an aircraft, in particular an airplane. A suction pump is used to take fuel from the feeder tank and to convey it to the engine via the feed circuit. The suction pump is also used for transferring fuel between the main tank and the feeder tank via a transfer circuit that is added to the fuel circuit and that is provided with a transfer ejector located inside the main tank.

Under such circumstances, the suction pump is a very high pressure pump, conventionally operating at a pressure of about 10 bar. The suction pump takes the quantity of fuel needed for satisfying the fuel requirements of the engine from the feeder tank. Such a quantity of fuel may be the sum of a said primary stream plus a said secondary stream delivered at the outlet of the feed ejector, in order to optimize the potential contribution in fuel to the engine. While the engine is in operation, the feed ejector is used in particular to increase the flow rate of fuel fed to the engine to match its requirements, such as during a stage in which the aircraft is accelerating.

A problem arises for rotorcraft because of the significant distance along the gravity axis between the main tank and the power plant. In the above-mentioned common example of the main tank and the power plant being located respectively under and above the cabin, such a separation distance may, by way of indication, be as much as 2.5 meters (m) or even more.

For safety reasons, the pressure of the fuel conveyed along the cabin of a rotorcraft via a feed circuit connecting a feeder tank to an engine must be limited as much as possible. Conventionally, such a pressure is limited to a pressure of the order of 1 bar. As an indication, the pressure of the fuel conveyed by the feed circuit lies in the range 1 bar to 2 bar. The feed circuit is dimensioned accordingly in order to be capable of delivering the fuel flow rate needed by the engine in its nominal mode of operation.

In a first common method of feeding fuel to a rotorcraft power plant, the feeder tank(s) respectively allocated to an engine house respective booster pumps in their bottoms. Such a booster pump is immersed inside the feeder tank and is driven in particular by electricity taken from the electricity network on board the rotorcraft. The booster pump takes fuel from the bottom of the feeder tank and discharges it through the feed circuit to the engine.

In a second common method of feeding fuel to a rotorcraft power plant, the or each engine is individually fitted with a suction pump that takes fuel by sucking it from the feeder tank allocated to the engine. The fuel is driven by suction through the feed circuit, the suction pump taking the quantity of fuel that is necessary for satisfying the fuel requirements of the engine.

An advantage of that second method lies with respect to rotorcraft safety in the event of the feed circuit being broken, as might happen during an emergency landing, for example. Once the feed circuit is broken, the suction pump is no longer capable of taking fuel from the feeder tank, thus making it possible to avoid fuel escaping and being spread out from the main tank through the broken zone of the feed circuit.

Nevertheless, a problem raised by that second method lies in priming the suction pump in the event of air being present inside the feed circuit. Because of said distance separating the feeder tank from the suction pump that is located close to the power plant, such air might be present, e.g. as a result of the feed circuit being connected to the atmosphere during a maintenance operation on the power plant, or indeed as a result of failed attempts at starting the engine that have been repeated successively.

In order to solve that problem, a conventional solution lies in adding a priming pump to the fluid flow network in order to prime the suction pump. Such a priming pump is placed in the bottom of the feeder tank in fluid flow communication with the feed circuit. The priming pump is in particular powered electrically from the electricity network on board the rotorcraft.

The priming pump is activated deliberately by the pilot of the rotorcraft, prior to starting the engine, in order to supply fuel to the feed circuit and prime the suction pump. Once the engine has started, the priming pump is deactivated and the suction pump provides the fuel flow necessary for the requirements of the engine. The flow of fuel conveyed to the engine via the feed circuit is regulated by the suction pump in response to control means for controlling the injection of the fuel delivered by the suction pump into the engine.

In the field of aviation there is a need to seek to limit the number of members on board an aircraft, but without that harming the operating safety of the aircraft, nor the ability of the aircraft to comply with regulatory safety conditions in the event of malfunction.

There is also a need in the field of aviation to seek to improve the ergonomics of aircraft in order to off-load the pilot as much as possible of tasks to be performed and in order to avoid causes of malfunction that might potentially be induced by pilot negligence.

In the light of these needs and in the context of said second method of feeding fuel to a rotorcraft power plant, it appears that the conditions for priming the suction pump would benefit from being improved.

BRIEF DESCRIPTION OF THE INVENTION

The object of the present invention is to provide an architecture for a fluid flow network for feeding fuel to at least one engine of a power plant driving rotation of at least one rotary wing of a rotorcraft, in particular while taking account of the various above-mentioned difficulties, constraints, and needs.

The fluid flow network of the present invention is more particularly of the type using a fuel suction pump for feeding an engine of the power plant in flight from a feeder tank housed in a main feed tank and allocated to the engine.

More particularly, the present invention seeks to provide such a fluid flow network of architecture that complies in satisfactory manner with the constraints associated with priming the suction pump, while taking account of said needs to be satisfied.

The fluid flow network of the present invention is a fluid flow network for feeding fuel to at least one engine of a power plant of a rotorcraft. Said power plant is for driving rotation of at least one rotary wing of the rotorcraft.

The fluid flow network includes at least one main fuel tank housing a feeder tank. The main tank may be subdivided into a plurality of compartments that are in natural fluid flow communication between one another. The feeder tank is formed by an enclosure placed inside the main tank, the feeder tank and the main tank forming capacities that are independent in terms of a free flow of fuel from the main tank to the feeder tank. The feeder tank is fed with fuel from the main tank via a transfer circuit for transferring fuel from the main tank to the feeder tank. The transfer circuit is a low pressure circuit. As an indication, its pressure may be less than about 100 mbar.

Said transfer circuit includes at least one transfer pump immersed in the feeder tank and at least one transfer ejector immersed in the main tank. A transfer stream of fuel from the feeder tank flows inside the transfer circuit under the effect of being entrained by the transfer pump. This transfer stream is conveyed to the transfer ejector in order to use the Venturi effect to take fuel from the inside of the main tank so as to supply the feeder tank with fuel by return of the fuel into the feeder tank.

The fluid flow network also includes a fuel suction pump allocated to the engine and conventionally located on the rotorcraft in the vicinity of the power plant. The suction pump takes fuel by suction from the feeder tank, and conveys it at high pressure to the engine via a feed circuit.

The feed circuit extends at least between a proximal end and a distal end immersed in the feeder tank, the proximal end being opposite from the distal end and being in fluid flow engagement with the suction pump. The feed circuit is preferably extended at its proximal end by control means for controlling the injection into the engine of the fuel that has been entrained from the feeder tank by the suction pump.

The relativity between the concepts of low pressure and high pressure needs to be considered, for which particular values have been given by way indication. The low pressure at which fuel is conveyed through the transfer circuit is very generally considered to be well below the high pressure for conveying fuel through the feed circuit, and such a pressure difference commonly presents a ratio lying in the range 4 to 6.

The fluid flow network also includes a pump for priming the suction pump with fuel. The priming pump is immersed in the feeder tank, with the priming pump taking fuel from the feeder tank and discharging it to the feed circuit. The priming pump delivers fuel from the feeder tank to the suction pump before the engine is started in order to prime the suction pump with fuel and push back any column of air that might have formed inside the feed circuit between its said ends.

In the present invention, the feed circuit is provided at its distal end with a feed ejector immersed inside the feeder tank. In particular, the feed ejector is arranged at the opening at the distal end of the feed circuit, and it allows fuel coming from the feeder tank to pass therethrough.

The feed ejector is constituted in particular by a conventional ejector having a nozzle for admitting a primary fuel stream into a main channel having a constriction. The nozzle conveys the primary fuel stream to an inlet of the main channel that is located upstream from the constriction, the fuel being exhausted from the ejector through an outlet of the main channel that is arranged downstream from the constriction. The ejector also has a secondary channel for passing a secondary fuel stream. The secondary channel leads to the upstream end of the main channel, e.g. inside an ejector chamber through which the nozzle passes. The concepts of upstream, downstream, inlet, and outlet should be considered relative to the flow direction of the fluid through the channels and/or the members and circuits through which the fluid is conveyed.

Still in the present invention, the transfer circuit is in fluid flow connection with the feed ejector via a said nozzle for admitting a primary fuel stream. The primary fuel stream is exhausted from the fuel ejector via a said main channel with a constriction leading to the feed circuit. Such exhausting of the primary stream is made use of prior to starting the engine for the purpose of priming the suction pump. Once the suction pump is primed and in operation, the fuel is conveyed by the transfer pump via the transfer circuit to the feed ejector, and is then entrained by the suction pump from the feed ejector to the feed circuit.

The supply of fuel to the engine in sufficient quantity to satisfy its instantaneous requirements is provided by the fuel being sucked through the main channel of the feed ejector by the suction pump. Since the flow rate of fuel needed for operating the engine is regulated by the suction pump, any surplus fuel coming from the transfer circuit and admitted by the feed ejector is potentially exhausted via said secondary channel of the feed ejector.

The fluid flow network includes means for priming the suction pump, which means associate the transfer pump forming a said priming pump and the feed ejector arranged on the feed circuit and immersed in the feeder tank. The feed ejector supplies fuel to the suction pump at pressures and flow rates for the fuel stream that are specific to different operating stages of the feed ejector:

Prior to starting the engine and the suction pump, fuel is admitted through the nozzle from the transfer circuit to the feed ejector, and is then discharged by the feed ejector to the feed circuit via the main channel. Since the suction pump is not put into operation before being primed, the fuel stream exhausted by the feed ejector into the feed circuit comes from a said primary fuel stream conveyed by the transfer circuit to the feed ejector. The fuel coming from the transfer circuit is admitted and discharged by the feed ejector at low pressure and at a low flow rate. Such low pressure and flow rate suffice to overcome any column of air that might be present inside the feed circuit and thus to prime the suction pump with fuel.

After the previously-primed suction pump has been put into operation, the transfer pump is kept in activity in order to supply the feeder tank with fuel from the main tank via the transfer circuit. The fuel that is conveyed to the feed ejector by the transfer circuit is entrained from the feed ejector to the feed circuit by suction from the suction pump. The flow rate and the pressure of the fuel stream generated at the outlet from the main channel of the feed ejector are derived from the suction generated by the suction pump via the feed circuit. Such suction is generated by the suction pump depending on the requirements of the engine and independently of the fuel stream flow rate admitted by the feed ejector via the nozzle from the transfer circuit. Any surplus fuel admitted by the feed ejector is discharged to the inside of the feeder tank via the secondary channel, in particular when starting the engine, since its fuel requirements are then low.

In general terms, the fluid flow network of the present invention is mainly recognizable in that the feed circuit is provided with a feed ejector immersed inside the feeder tank. The feed ejector has a nozzle for admitting a primary fuel stream to a main channel with a constriction leading to the feed circuit. The feed ejector also has a secondary channel for passing a secondary fuel stream. Said secondary channel leads to the upstream end of the main channel. The priming pump is formed by the transfer pump. The transfer circuit includes a branch connection for admitting a said primary fuel stream through the nozzle to the main channel. Said admission of the primary fuel stream through the nozzle is fed by the transfer circuit by being forced at low pressure by the transfer pump.

Said branch connection is provided in particular on the transfer circuit downstream from the transfer pump and upstream from the transfer ejector.

Providing operation of the suction pump is inhibited, the feed ejector is a member for low-pressure and low-flow rate delivery to the feed circuit of a priming stream of fuel for the suction pump. Said priming stream is fed from the primary stream of fuel coming from the transfer circuit, with excess fuel admitted by the feed ejector from the transfer circuit being exhausted from the feed ejector through the secondary channel.

Providing the suction pump is activated, the feed ejector is a member for sucking fuel that is driven through the main channel to the feed circuit by the suction pump. The transfer pump generates a marginal contribution in terms of pressure to the stream of fuel exhausted from the feed ejector to the feed circuit, the flow rate of said exhausted fuel stream being regulated by the suction pump for a given pressure imposed by the characteristics of the feed circuit and of the suction pump.

The present invention also provides a method of using a fluid flow network as described above.

Such a method is mainly recognizable in that prior to an operation of starting the engine during a stage of priming the suction pump, the method comprises an operation of the feed ejector discharging a fuel stream at low pressure and at low flow rate into the feed circuit in order to prime the suction pump. The fuel from said fuel stream for priming the suction pump is taken from the feeder tank via a transfer circuit, said discharge operation being performed by activating the operation of the transfer pump. The operation of priming the suction pump corresponds to an operation of discharging fuel through the feed ejector by means of the transfer pump.

In a specific approach of the present invention, the suction pump has priming means associating the transfer pump that forms the priming pump with the ejector that provides pressurization of the fuel stream coming from the transfer circuit in order to discharge it at a pressure appropriate for entraining fuel from the feeder tank, through the feed circuit, and to the suction pump, in order to prime it.

More particularly, the transfer pump may operate at a pressure that is just sufficient for feeding the feeder tank with fuel from the main tank, independently of the pressure requirements of the fuel conveyed from the feeder tank through the feed circuit. Said pressure requirements correspond to a priming pressure suitable for entraining fuel through the feed circuit from the feeder tank to the suction pump and for priming the suction pump before starting the engine. The lack of pressure between the priming pressure and the fuel pressure generated by the transfer pump is made up by the ejector that receives fuel from the transfer circuit at a pressure corresponding to the operating pressure of the transfer pump, and that discharges the fuel it receives at said priming pressure.

In such an advantageous approach in the use of the fluid flow network of the present invention, while priming the suction pump, the transfer pump forming the priming pump is operated at an operating pressure suitable for supplying fuel to the feeder tank from the main tank. Such an arrangement avoids potentially overdimensioning the transfer pump, which should be avoided, and makes it easy to incorporate the means for priming the suction pump in an already-existing fluid flow network architecture. Said operating pressure of the transfer pump is independent of, and in particular may be less than, a priming pressure suitable for entraining fuel through the feed circuit from the feeder tank to the suction pump in order to prime it. The ejector pressurizes the fuel stream it receives from the transfer circuit to a pressure that is not less than said priming pressure, and delivers it to the feed circuit. It should be understood that the ejector is dimensioned to provide said pressurization and said delivery.

While the engine is operating, use of the suction pump and of the transfer pump respectively is maintained. The method comprises an operation whereby the suction pump regulates the flow rate of fuel entrained by suction through the feed ejector from the feeder tank to the feed circuit. Said fuel flow rate regulation is performed by regulated suction of the fuel by the suction pump as a function of the fuel requirements of the engine. This regulation of the fuel flow rate is performed independently of the rate at which fuel is admitted by force through the feed ejector from the transfer circuit fed with fuel by the transfer pump, operation of the transfer pump then being activated.

The pressure at the outlet from the feed ejector of the fuel stream admitted into the feed circuit under the effect of being entrained by the suction pump is advantageously facilitated by the low pressure of said primary fuel stream for which admission to the feed ejector is sustained by maintaining operation of the transfer pump. The transfer pump provides a marginal contribution to the pressure of the fuel stream exhausted from the feed ejector to the feed circuit, while assisting the suction pump in providing the force needed for delivering fuel to the feed circuit.

Regardless of whether the suction pump is being primed or the engine is being started, or indeed during a stage of operating the engine as a function of the fuel requirements of the engine, any surplus fuel admitted by the feed ejector from the transfer circuit is discharged to the feeder tank via the secondary channel of the feed ejector.

BRIEF DESCRIPTION OF THE SEVERAL VIEWS OF THE DRAWINGS

An embodiment of the present invention is described with reference to the figures of the accompanying sheets, in which:

FIG. 1 is a diagram showing a fluid flow network for feeding fuel in a suction pump fitted to an engine of a rotorcraft;

FIGS. 2 and 3 are diagrams of a feed ejector fitted to a feed circuit included in the fluid flow network shown in FIG. 1, in respective operating modes of the feed ejector; and FIG. 4 is a diagram showing the way fuel flow is sucked through the feed ejector shown in FIGS. 2 and 3.

DETAILED DESCRIPTION OF THE INVENTION

In FIG. 1, a rotary wing 1 of a rotorcraft is driven in rotation by an engine 2. The engine 2 is supplied with fuel by means of a suction pump 3 with which it is fitted. The suction pump 3 takes fuel via a feed circuit 4, by sucking from a feeder tank 5 containing a supply of fuel. The proximal end 6 of the feed circuit 4 is in fluid flow communication with the suction pump 3. The distal end 7 of the feed circuit 4 is in fluid flow communication with the bottom of the feeder tank 5.

The fuel requirements of the engine 2 when in operation are managed on the basis of a fuel flow rate delivered by the suction pump 3 at a given pressure, by control means 8 for controlling the injection of fuel from the suction pump 3 into the engine 2. The suction pump 3 is a high pressure pump, and by way of indication that high pressure may be of the order of one bar.

The feeder tank 5 is a container placed inside a main fuel tank 9, and it has sufficient capacity to feed the engine 2 with fuel for a predetermined period. A fuel transfer circuit 10 is provided between the main tank 9 and the feeder tank 5 in order to supply fuel to the feeder tank 5 from the main tank 9. The rate at which fuel is taken to the feeder tank 5 by the transfer circuit 10 is greater than that needed for supplying the engine 2 with fuel while it is in operation. Any excess fuel is naturally exhausted from the feeder tank 5 to the main tank 9 via an overflow device 11 forming part of the feeder tank 5.

The transfer circuit 10 includes a transfer pump 12 immersed inside the feeder tank 5, and it extends between the feeder tank 5 and the main tank 9. The transfer circuit 10 includes a transfer ejector 13 placed inside the main tank 9. From the stream of fuel generated by the transfer pump 12 and taken from the feeder tank 5, the transfer ejector 13 uses the Venturi effect to pick up an intake of fuel for delivery to the feeder tank 5.

The transfer pump 12 is a low pressure pump, by way of indication its pressure may lie in the range about 100 mbar to 150 mbar. Such a low pressure suffices for conveying fuel through the transfer circuit 10, given the proximity between the main tank 9 and the feeder tank 5. As an indication, the rate at which fuel flows inside the transfer circuit 10 lies in the range 300 liters per hour (L/h) to 500 L/h, approximately.

On board a rotorcraft, the main tank 9 is conventionally located at a considerable vertical distance from the engine 2. The vertical direction should be considered relative to the gravity axis when the rotorcraft is in a natural situation at rest on the ground. In a common example, the engine 2 is located on top of a cabin of the rotorcraft, while the main tank 9 is placed under the cabin. Such a distance between the engine 2 and the main tank 9 means that the feed circuit 4 has considerable vertical extent, with the consequence that air might be present inside the column 14 formed by the feed circuit 4. Such a column 14 makes it difficult to prime the suction pump 3 before starting the engine 2.

In order to prime the suction pump 3 in spite of the presence of air in the column 14, the transfer pump 12 is used to form a pump for priming the suction pump 3. Nevertheless, although the rate at which fuel flows through the transfer circuit 10 is sufficient, the pressure delivered by the transfer pump 12 is generally not sufficient to overcome the column 14. A feed ejector 15 is associated with the transfer pump 12 in order to provide extra pressure to the fuel discharged by the feed ejector 15 from the feeder tank 5 towards the suction pump 3.

More particularly, the feed circuit 4 is provided with a feed ejector 15 immersed inside the feeder tank 5. A branch connection 16 of the transfer circuit 10 is in fluid flow communication with a nozzle of the feed ejector 15 in order to discharge fuel towards the suction pump 3 for the purpose of priming it prior to starting the engine 2. The said branch connection 16 is preferably provided on the transfer circuit 10 downstream from the transfer pump 12 and upstream from the transfer ejector 13.

While the engine 2 is in operation, the fuel conveyed towards the feed ejector 15 from the transfer circuit 10 is entrained by suction by means of the suction pump 3 so as to satisfy the fuel requirements of the engine 2.

More particularly, in FIGS. 2 and 3, the feed ejector 15 is an ejector of conventional structure comprising a nozzle 17 for admitting a primary stream 18 of fuel towards an inlet 19 of a main channel 20 having a constriction 21. An outlet 22 from the main channel 20 serves to exhaust a stream of fuel 23 from the feed ejector 15 into the feed circuit 4.

The feed ejector 15 has a secondary fuel flow channel 24. In the embodiment shown, the secondary channel 24 opens out into a chamber 26 provided upstream from the main channel 20 and having the nozzle 17 passing therethrough. The feed ejector 15 is dimensioned to enable fuel to be entrained through it under the effect of the suction generated by the suction pump 3 at a rate and at a pressure that are suitable for satisfying any fuel requirements of the engine. The feed circuit 4 is in fluid flow communication with the feed ejector 15 via the outlet 22 of the main channel 20.

The capacity of the suction pump 3 is sufficient to generate high pressure, such as the above-mentioned pressure of the order of one bar, so as to be capable of supplying the engine with fuel at a rate that might vary considerably. The variation in the rate at which the engine is supplied with fuel is induced as a function of the short-term requirements of the engine for fuel, given the various stages and modes of its operation. As an indication, the fuel requirements of the engine on starting are about 40 L/h to 60 L/h, and while in an operating stage they lie on average in the range about 300 L/h to 500 L/h.

The transfer circuit 10 is put into fluid flow communication with the feed ejector 15 via the nozzle 17. The primary stream 18 of fuel is delivered by the transfer circuit 10, being conveyed at low pressure as generated by the transfer pump 12.

In FIG. 2, the feed ejector 15 is used to allow the suction pump 3 to be primed before starting the engine and before activating operation of the suction pump 3. The fuel is conveyed to the nozzle 17 via the transfer circuit 10, flowing along the main channel 20 as a said primary stream 18, and is then exhausted from the feed ejector 15 towards the feed circuit 4 via the outlet 22. The pressure of the primary stream 18 delivered from the transfer pump 12 is sufficient to overcome the column formed by the feed circuit 4. Since the flow rate of fuel from the transfer circuit 10 is considerable and at low pressure, it is observed that fuel is discharged at 25 to the feeder tank via the secondary channel 24.

In FIG. 3, the feed ejector 15 is used to feed the feed circuit 4 from fuel sucked from the inside of the feeder tank while the engine is in operation. The flow rate of fuel from the main channel 20 is regulated by the suction pump 3 that is placed under the control of the control means for controlling fuel injection to the engine depending on the instantaneous requirements of the engine. Operation of the transfer pump 12 is maintained active in order to feed the feeder tank continuously. The secondary channel 24 is used to discharge any surplus fuel as a function of the rate at which fuel is exhausted 23 to the feed circuit 4 via the main channel 20 under the effect of the fuel suction generated by the suction pump 3. A backflow of fuel 25 through the secondary channel is induced in particular during starting of the engine, since its fuel requirements are low.

Whatever the rate at which fuel comes from the transfer circuit 10 and is admitted by the feed ejector 15, the rate at which fuel is exhausted 23 from the feed ejector 15 to the feed circuit 4 is regulated by the suction pump 3 as a function of the instantaneous fuel requirements of the engine. It is observed that the primary stream 18 of fuel at low pressure admitted by the feed ejector 15 from the transfer circuit 10 gives rise to a pressure boost to the suction generated at the outlet from the feed ejector 15 by the suction pump 3. Such a pressure boost presents the advantage of facilitating establishing a flow of fuel through the feed circuit 4 in order to overcome the column it forms.

In FIG. 4, the feed ejector is dimensioned to enable fuel to be supplied to the engine whatever its requirements. The graph of FIG. 4 shows the operating conditions of the feed ejector that depend on such dimensioning.

More particularly, the graph shows the relationship between the pressure P at the outlet from the feed ejector and the flow rate D of fuel flowing through the main channel of the feed ejector. The region A corresponds to a reference level at which the fuel flow rate from the feed ejector is zero for a pressure generated at the outlet from the main channel lying in the range 150 mbar to 200 mbar approximately.

With reference to the region B, it can be seen that the feed ejector can discharge fuel by generating a pressure P that is higher than that of the reference level. While the engine is being started, its fuel requirements are less than about 100 L/h, e.g. about 50 L/h. The suction pump generates fuel suction via the main channel lying in the range 300 L/h to 500 L/h, e.g. by way of indication at about 400 L/h. The feed ejector returns fuel via the secondary channel, by way of indication in this example at about 350 L/h, thereby generating a pressure P greater than the pressure of the reference level A. Such a pressure P makes it possible to overcome the head losses induced by the column of the feed circuit.

While the engine is in a stage of nominal operation, and with reference to the region C, the fuel requirements of the engine correspond substantially to the rate at which fuel is admitted by the feed ejector from the transfer circuit. The feed ejector no longer discharges fuel via the secondary channel, and tends to lose pressure P, although the pressure nevertheless remains sufficient to overcome the column of the feed circuit.

It should be considered that in the event of possible failure of the transfer pump 12, the supply of fuel to the engine 2 is maintained with fuel sucked through the feed ejector 15 by the suction pump 3 and taken from the feeder tank 5. The head losses induced by the fuel passing through the feed ejector 15 are acceptable, and by way of indication they are about 15 mbar for a feed ejector dimensioned to correspond with the values given for the example flow rate D and pressure P of the fuel sucked by the suction pump 3.

It should also be considered that possible damage to the feed circuit 4 could interrupt the suction of fuel from the feeder tank 5 by the suction pump 3. By way of example, such damage could be caused during an emergency landing of the rotorcraft. In the event of such damage, fuel loss through the damaged zone of the feed circuit 4 is avoided, thereby presenting the advantage of preserving the environment and making the rotorcraft safer on the ground. In the event of the feed circuit 4 being damaged, the pressure P at the outlet from the feed ejector 15 through the outlet 22 naturally drops. Because the feed circuit 4 is put into communication with the atmosphere, the fuel admitted through the feed ejector 15 at low pressure from the transfer circuit 10 is exhausted to the feeder tank 5 via the secondary channel 24.

What is claimed is:

1. A fluid flow network for feeding fuel to at least one engine of a power plant driving the rotation of at least one rotary wing of a rotorcraft, the fluid flow network comprising at least:
   at least one main fuel tank housing a feeder tank fed with fuel from the main tank by a transfer circuit for transferring fuel at low pressure from the main tank to the feeder tank;
   said transfer circuit including at least one transfer pump immersed in the feeder tank and at least one transfer ejector immersed in the main tank;
   a fuel suction pump fitted to the engine, the suction pump taking fuel from the feeder tank and conveying it at high pressure to the engine via a feed circuit; and
   a priming pump for priming the suction pump with fuel, the priming pump being immersed in the feeder tank, from which feeder tank the priming pump takes fuel and discharges it to the feed circuit;
   wherein:
   the feed circuit is provided with a feed ejector immersed inside the feeder tank, the feed ejector comprising:
   a nozzle for admitting a primary stream of fuel into a main channel having a constriction and leading to the feed circuit; and
   a secondary channel for passing a secondary stream of fuel, the secondary channel leading from upstream of the main channel; and wherein
   the priming pump is formed by the transfer pump, the transfer circuit including a branch connection for admitting a said primary stream of fuel through the nozzle to the main channel, said admission of the primary stream of fuel being fed by the transfer circuit by being forced at low pressure by the transfer pump.

2. A fluid flow network according to claim 1, wherein said branch connection is provided on the transfer circuit downstream from the transfer pump and upstream from the transfer ejector.

3. A fluid flow network according to claim 1, wherein with the operation of the suction pump being inhibited, the feed ejector is a member for low-pressure and low flow rate delivery to the feed circuit of a priming stream of fuel for the suction pump, said priming stream being fed from the primary stream of fuel coming from the transfer circuit, with excess fuel being exhausted from the feed ejector through the secondary channel.

4. A fluid flow network according to claim 1, wherein, with the operation of the suction pump activated, the feed ejector is a member for sucking fuel that is driven through the main channel to the feed circuit by the suction pump, the transfer pump generating a marginal contribution in terms of pressure to the stream of fuel exhausted from the feed ejector to the feed circuit, the flow rate of said exhausted fuel stream being regulated by the suction pump.

5. A method of operating a fluid flow network according to claim 1, wherein prior to an operation of starting the engine, and during a stage of priming the suction pump, the method comprises an operation of the feed ejector discharging a fuel stream at low pressure and at low flow rate into the feed circuit in order to prime the suction pump, the fuel being taken from the feeder tank via a transfer circuit, said discharge operation being performed by activating the operation of the transfer pump.

6. A method according to claim 5, wherein during the stage of priming the suction pump:
   the transfer pump acting as the priming pump is operated at an operating pressure suitable for supplying fuel to the feeder tank from the main tank, said operating pressure being less than a priming pressure suitable for entraining fuel through the feed circuit from the feeder tank to the suction pump and priming it; and
   the ejector pressurizes the fuel stream it receives from the transfer circuit to a pressure that is not less than said priming pressure, and delivers it to the feed circuit.

7. A method according to claim 5, wherein during a stage in which the engine is in operation, the method comprises an operation whereby the suction pump regulates the flow rate of fuel entrained by suction through the feed ejector from the feeder tank to the feed circuit, said fuel flow rate regulation being performed by regulated suction of the fuel by the suction pump independently of the rate at which fuel is admitted by force through the feed ejector from the transfer circuit fed with fuel by the transfer pump, operation of the transfer pump then being activated.

8. A method according to claim 7, wherein the pressure at the outlet from the feed ejector of the fuel stream admitted into the feed circuit under the effect of being entrained by the suction pump is facilitated by the low pressure of the primary fuel stream for which admission to the feed ejector is sustained by maintaining operation of the transfer pump.

9. A method according to claim 5, wherein regardless of whether the suction pump is being primed or the engine is being started, any surplus fuel admitted by the feed ejector from the transfer circuit is discharged to the feeder tank via the secondary channel of the feed ejector.

* * * * *